US007224504B2

United States Patent
Govil et al.

(10) Patent No.: US 7,224,504 B2
(45) Date of Patent: May 29, 2007

(54) DEFORMABLE MIRROR USING PIEZOELECTRIC ACTUATORS FORMED AS AN INTEGRATED CIRCUIT AND METHOD OF USE

(75) Inventors: Pradeep K Govil, Norwalk, CT (US); Andrew Guzman, Danbury, CT (US)

(73) Assignee: ASML Holding N. V. (NL)

( * ) Notice: Subject to any disclaimer, the term of this patent is extended or adjusted under 35 U.S.C. 154(b) by 303 days.

(21) Appl. No.: 10/629,798

(22) Filed: Jul. 30, 2003

(65) Prior Publication Data

US 2005/0023573 A1    Feb. 3, 2005

(51) Int. Cl.
    *G02B 26/08* (2006.01)
(52) U.S. Cl. .................. 359/224; 359/223; 310/311
(58) Field of Classification Search ............... None
    See application file for complete search history.

(56) References Cited

U.S. PATENT DOCUMENTS

| 5,245,464 A * | 9/1993 | Jensen ...................... 359/224 |
| 2002/0011573 A1 * | 1/2002 | Van Dijsseldonk et al. ............... 250/492.22 |

* cited by examiner

*Primary Examiner*—James Phan
(74) *Attorney, Agent, or Firm*—Sterne Kessler Goldstein & Fox

(57) ABSTRACT

A deformable optical device includes a reflection device having a first reflecting surface and a second surface, an actuator (e.g., an integrated circuit piezoelectric actuator) having a support device and moveable extensions extending therefrom, which are coupled to the second surface, and electrodes coupled to corresponding ones of the extensions. Wavefront aberrations are detected and used to generate a control signal. The extensions are moved based on the control signal. The movement deforms the reflecting surface to correct the aberrations in the wavefront.

21 Claims, 3 Drawing Sheets

DEFORMABLE MIRROR USING PIEZOELECTRIC ACTUATORS FORMED AS AN INTEGRATED CIRCUIT AND METHOD OF USE

BACKGROUND OF THE INVENTION

1. Field of the Invention

The present invention is related to deformable optical devices.

2. Background Art

Light passing through an optical system can become distorted for various reasons. A lens, mirror, coatings thereon, or other devices in the optical system can: have imperfections, contaminants, or defects on their surface or within their structure. These together with thermal and other environmental factors including the ambient properties are sources of error in the light beam. Wavefront aberrations can lead to substantial degrading of the operation of an apparatus having the optical system.

For example, in photolithography where the state of the art requires nanometer level resolution, even small wavefront aberrations in the light beam can cause substantial errors in patterned devices. If these errors are outside of a tolerance budget, the devices will fail. Thus, optical elements within the photolithography systems must be manufactured to exacting tolerances and their environment tightly controlled.

Since practical limits exist in manufacturing tolerances and environmental control, some optical systems use deformable optics, such as deformable mirrors, to help compensate for wavefront aberrations. The deformable mirrors normally include an array of discrete actuators coupled between the mirror and a support. A measuring device (e.g., inline or offline) measures, either continuously or at the beginning of a cycle, the wavefront aberrations at one or more sections of the optical system. A control signal is then generated and transmitted to the actuators, which individually move an area of the deformable optic. The wavefront of the light beam reflecting from the deformed surface is adjusted to compensate for the aberration, and produce a substantially ideal wavefront.

One problem with the conventional deformable optics is that they use rather large actuators to move the optic. Based on the actuator's size and the size of the deformable optic, only a certain number of actuators (e.g., a certain density of actuators) can be coupled to the deformable optic, which limits the amount of fine correction. Density also directly correlates to the type of aberration that can be corrected, i.e., a lower density only allows for correction of lower order (e.g. lower spatial frequency) aberrations. Typical deformable optics can correct for only low order aberrations based on their low actuator density. However, sometimes higher order (e.g. higher spatial frequency) aberrations are necessary to correct. For example, sometimes wavefront aberrations are characterized using Standard Zernike polynomials, including higher orders. Conventional actuator densities cannot adequately correct for higher order terms.

Therefore, a deformable optic is needed that can correct for higher order terms of wavefront aberrations in an optical system.

BRIEF SUMMARY OF THE INVENTION

Embodiments of the present invention provide a deformable optical system. The deformable optical system includes a reflection device having a first reflecting surface and a second surface and an integrated circuit actuator having a support device and moveable extensions extending from the support surface and coupled to the second surface. Electrodes are individually coupled to corresponding ones of the extensions. A controller is coupled to the electrodes and is configured to control the extensions via the electrodes.

Other embodiments of the present invention provide a deformable optical device. The deformable optical device includes a reflection device having a first reflecting surface and a second surface, an integrated circuit actuator having a support device and moveable extensions extending therefrom, which are coupled to the second surface, and electrodes coupled to corresponding ones of the extensions.

Still other embodiments of the present invention provide a method. The method includes detecting a wavefront aberration, generating a control signal based on the detected aberration, moving extensions of a integrated circuit piezoelectric actuator based on the control signal, and deforming a reflector based on the moving of the extensions to correct the aberrations in the wavefront.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
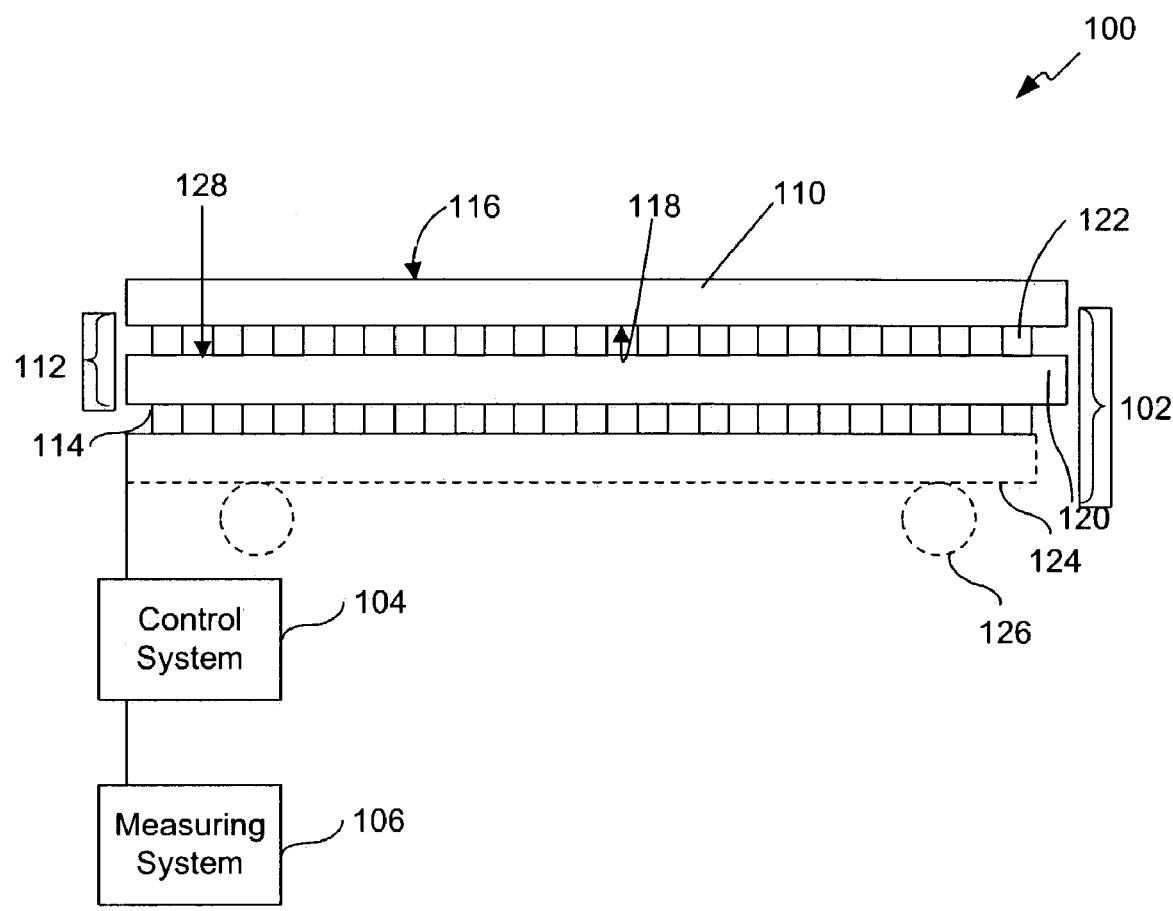
FIG. 1 is a deformable optic system according to an embodiment of the present invention.

The present invention is described with reference to the accompanying drawings. In the drawings, like reference numbers can indicate identical or functionally similar elements. Additionally, the leftmost digit of a reference number usually identifies the drawing in which the reference number first appears.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Embodiments of the present invention provide a deformable optical device having a reflective device coupled to an integrated circuit actuator including a support device and moveable extensions formed thereon. The integrated circuit actuator has a very high density of extensions (e.g., actuation devices), which can be formed in any pattern desired.

The high density of actuators is possibly because of using integrated circuit technology to manufacture the actuator. For example, the extensions can be on a micron scale and related density, which was not possible in conventional actuators. Larger scale (e.g. millimeter scale) extensions and related density are possible also; therefore the use of integrated circuit technology is applicable both within and outside of the realm of conventional actuators. Furthermore, the scale of extensions and related density are only limited by the state of the art of integrated circuit technology and thus sub-micron level scales are also possible. Having the high density of extensions allows the integrated circuit actuator to individually (or in small groups to) deform very small (e.g., micron level) areas of the reflective device, producing a very fine tunable deformation. This, in turn, allows the deformable mirror to correct for high order aberrations in a wavefront as well as low order.

For example, an integrated circuit piezoelectric actuator having a very high number of piezoelectric pins on a micron scale that extend from a support can be formed, for example using lithography techniques. Each pin on the actuator can be individually coupled through individual control lines to a controller. The pins are coupled to small areas of the reflective optic, so that very fine adjustments can be made to the reflective surface of the reflective optic. In one embodiment, there can be up to about 1 million actuators per square millimeter, which is much denser than conventional systems by several orders of magnitude. For example, U.S. Pat. No. 4,944,580 to MacDonald et al. shows a conventional actuator element being about 0.2–0.3 inches on a side (e.g., 5 mm on a side), which is about 0.04 per square millimeter. It is to be appreciated that even more actuators may be manufactured per square millimeter as technology advances, as would be obvious to one of ordinary skill in the art. This is also contemplated within the scope of the present invention.

Further, using integrated circuit technology to manufacture the actuator elements allows for a substantial decrease in overall cost and a substantial increase in the complexity of patterns that the actuator elements can be formed in to interact with the deformable optic.

Planar Actuator and Reflective Device

FIG. 1 shows a system 100 according to embodiments of the present invention. One example of system 100 is a deformable optics system. System 100 includes a deformable optics device 102 coupled to a control system 104. Optionally, a measuring system 106 can also be coupled to the control system 104. Measuring system 106 can be used to detect a wavefront of light passing through system 100 to determine wavefront aberrations. Controller 104 can then calculate compensation values, and control signals based thereon can be used to control deformable optics device 102.

For example, light passing through an optical system and/or a reticle in a lithography system can be measured (either offline or online), using measuring system 106, to detect wavefront aberrations. A compensation value can be calculated, which is used to generate control signals transmitted from control system 104 to deformable optics device 102. Then, before the light is projected onto a substrate for patterning, the light is reflected from deformable optics device 102. Thus, the patterning light is substantially corrected of aberrations, greatly improving the performance of a patterned device.

Deformable optics device 102 includes a reflective device 110 (e.g., a mirror), an integrated circuit actuator 112 (e.g., an integrated circuit set of piezoelectric actuators), and electrodes 114. Reflective device 110 includes a first reflective surface 116 and a second surface 118. Actuator 112 includes a support device 120 (e.g., a piezoelectric chuck, or the like) with extensions 122 (e.g., moveable extensions, such as piezoelectric pins, strips, concentric rings, or other shapes) extending therefrom. Extensions 122 can be formed on support device 120 via lithography methods, or the like, and can be on a micron scale (or any scale within the realm of integrated circuit technology). In various embodiments, extensions 122 can be formed from lead zirconate titanate (PZT), zinc oxide (ZO), polyvinylidene fluoride (PVDF) polymer films, and the like (hereinafter, the term piezoelectric and all possible piezoelectric materials, for example PZT, ZO, PVDF, and the like, will be referred to as "PZT").

An optional second support device 124 could be used to support electrodes 114. Second support device 124 can include a connection circuit (not shown) coupling controller 104 to electrodes 114. Also, second support device 124 can be coupled to optional mounting balls 126 (e.g., a ball grid array). In some embodiments, support device 120 can have a conductive (e.g., nickel (Ni)) plated surface 128. Also, in some embodiments, electrodes 114 can be conductivly (e.g, Ni) plated.

Using integrated circuit PZT technology for actuator 112 allows for each individual actuator 122 (e.g., PZT pin) to be substantially smaller compared to conventional discrete actuators. For example, PZT pins 122 can be between about 1 to about 10 microns in width or diameter, depending on their shape. This can result in a very high density of PZT pins 122, which provides high resolution and improved wavelength correction. For example, integrated circuit PZT technology can allow for correction capability of one or a combination of Standard Zernike higher order polynomial terms with very little residual error. Also, by using the integrated circuit PZT technique, high density can be achieved for virtually any pattern of PZT pins 122.

Using piezoelectric technology allows for monitoring of movement of each individual PZT pin 122 and each small area of reflective surface 116 controlled by each PZT pin 122. This is because each PZT pin 122 acts as a capacitance. A change in capacitance of PZT pins 122 can be monitored, which indicates whether each individual PZT pin 122 has expanded and/or contracted. Thus, system 100 can be used to verify movement of reflective surface 116 based on verifying movement of PZT pin 122. In some cases, a value of change of capacitance can be equated to an actual distance moved of each PZT pin 122, which can also be monitored.

A channel depth between each PZT pin 122 (e.g., height of each PZT pin 122) can be adjusted during formation based on a desired amount of decoupling between PZT pins 122 that is desired. For example, if some parts of reflective surface 116 are best moved as larger sections, while other parts are best moved as smaller sections, a height of PZT pins in the various areas can be formed to reflect this. The less height, the less decoupled, i.e., the more adjacent PZT pins 122 are affected by adjacent pins. In contrast, the more height, the more decoupled, i.e., very fine-tuning of reflective surface 116 can result with very tall PZT pins 122.

Using integrated circuit PZT technology further allows for formation of PZT pins 122 having variable spatial density (e.g., a radial axis) and variable spatial patterns (radial, Cartesian, asymmetric, etc.). This can lead to ever better wavefront correction, particularly for higher order Zernike terms.

Curved Actuator and Deformable Optic Device

It is to be appreciated that deformable optics device 102 can be of any shape, and not just planar, as would be known to a skilled artisan.

Figure 2:
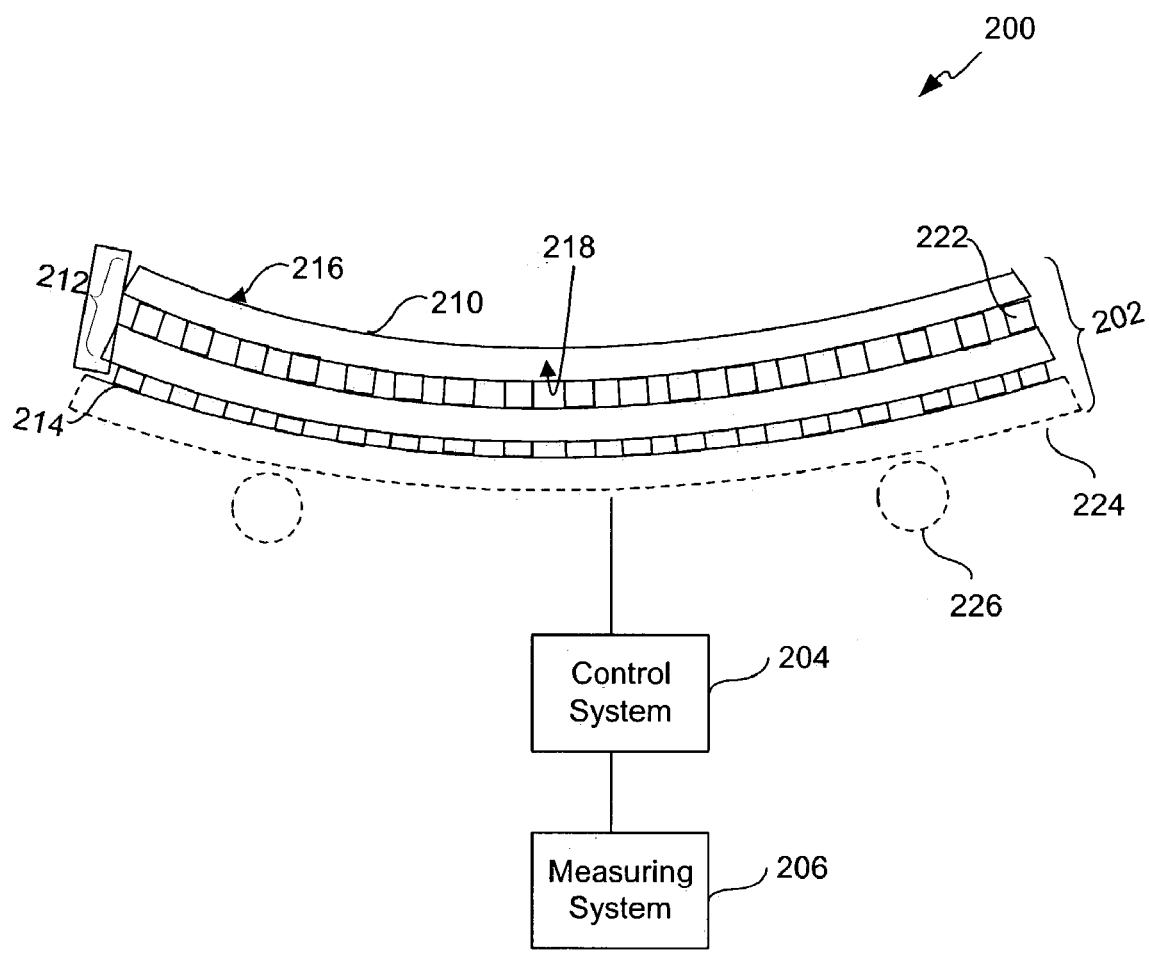
FIG. 2 is a deformable optic system according to another embodiment of the present invention.

For example, as shown in FIG. 2, a curved (e.g., an aspherical, etc.) deformable optics device 202 can be used in a system 200 according to embodiments of the present invention. Deformable optics device 202 can be coupled to a control system 204, which can be coupled to a measuring system 206, as described above.

Deformable optics device 202 includes a reflective device 210 (e.g., a mirror), an actuator 212 (e.g., an integrated circuit set of piezoelectric (PZT) actuators), and electrodes 214. Reflective device 210 includes a first reflective surface 216 and a second surface 218. Actuator 212 includes a support device 220 (e.g., a PZT chuck, or the like) and extensions 222 (e.g., moveable extensions, such as PZT pins) extending therefrom. Extensions 222 can be formed on support device 220 via lithography methods, or the like.

An optional second support device 224 could be used to support electrodes 214. Second support device 224 can include a connection circuit coupled controller 204 to electrodes 214. Also, second support device 224 can be coupled to optional mounting balls 126. In some embodiments, support device 220 can have a nickel (Ni) plated surface 228. Also, in some embodiments, electrodes 214 can be Ni plated.

Example Actuator Extension Configuration

Figure 3:
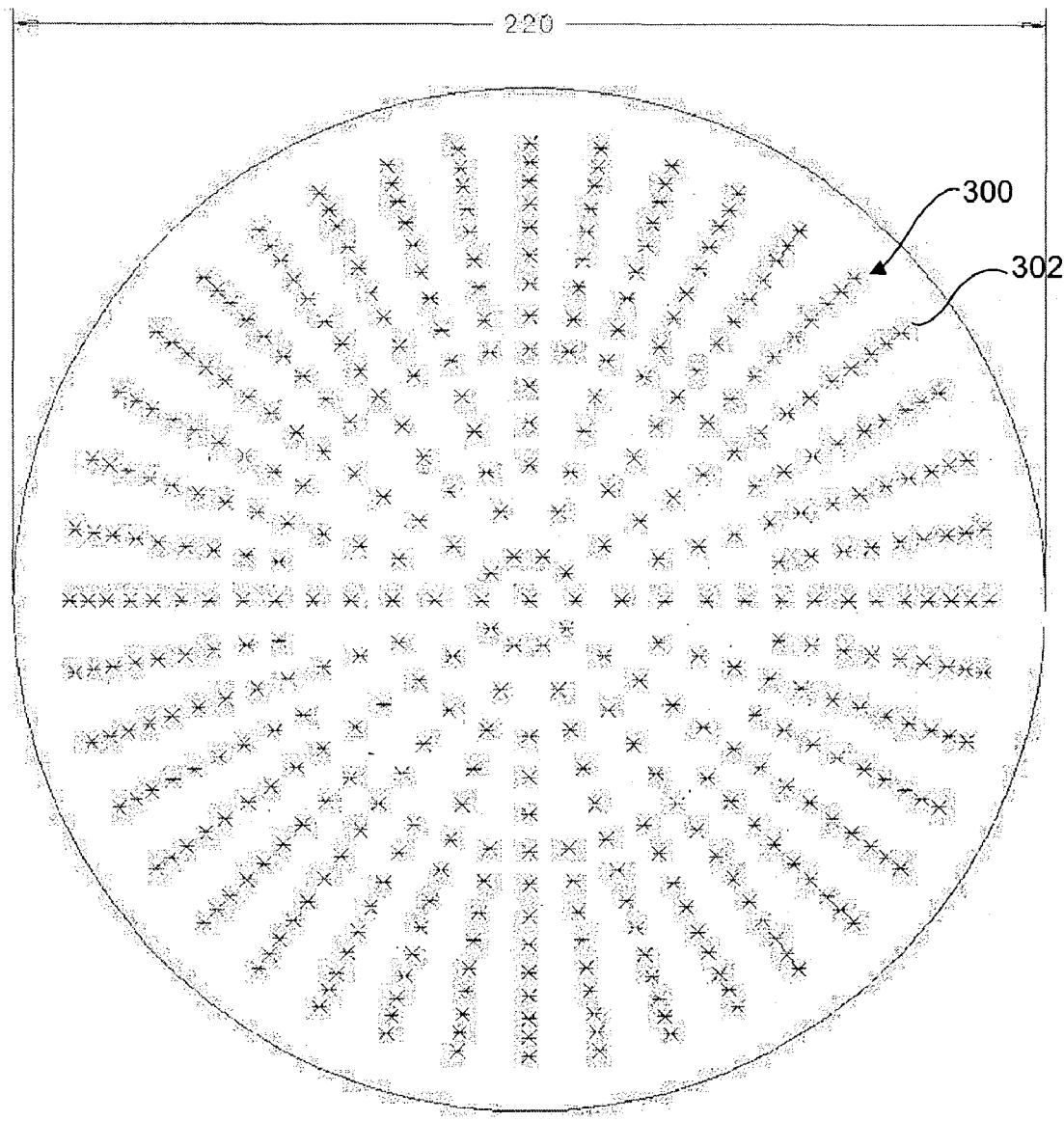
FIG. 3 shows an exemplary actuator extension configuration according to embodiments of the present invention.

FIG. 3 shows an exemplary actuator extension configuration 300 according to embodiments of the present invention. Each asterisk 302 is located where an actuator element will interact with a deformable optic (e.g., 102 or 202). This pattern includes a variable density (e.g., spacing) and complex radial concentric pattern. This is accomplished using the integrated circuit actuators, which allows for variable density. Also, all actuators can fall in a predefined plane (e.g., flat, curved, etc.) because of using integrated circuit manufacturing technology. This type of pattern was not available in conventional systems because of their use of discrete actuators.

CONCLUSION

Example embodiments of the methods, circuits, and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A deformable optical system, comprising:
a reflection device having a first reflecting surface and a second surface;
a piezoelectric actuator having a piezoelectric chuck and moveable extensions including piezoelectric pins, strips, or concentric rings, each of the extensions being coupled at a first end to a surface of the piezoelectric chuck and at a second end to the second surface of the reflection device;
electrodes individually coupled to corresponding ones of the extensions; and
a controller coupled to the electrodes configured to control movement of the extensions via the electrodes,
wherein the control system measures a change in capacitance of the extensions to determine characteristics of movement of the extensions.

2. The deformable optical system of claim 1, wherein the reflection device is a mirror.

3. The deformable optical system of claim 1, further comprising:
a conductive coating on the surface of the piezoelectric chuck; and
a conductive coating on the electrodes.

4. The deformable optical system of claim 1, further comprising:
a measuring system configured to measure a wavefront aberration, wherein the controller controls the extensions based on the measured wavefront aberration.

5. The deformable optical system of claim 4, wherein a number of the extensions used corrects higher order portions of the measured wavefront aberration.

6. The deformable optical system of claim 4, wherein a number of the extensions used corrects for all orders of the measured wavefront aberration.

7. The deformable optical system of claim 1, wherein the characteristic of movement of the extensions corresponds to a characteristic of movement of the first reflecting surface.

8. The deformable optical system of claim 1, wherein the reflection device is substantially planar.

9. The deformable optical system of claim 1, wherein the reflection device is curved.

10. The deformable optical system of claim 1, wherein a height of the extensions correlates to an amount of decoupling of the extensions from each other.

11. The deformable optical system of claim 1, wherein the extensions are from less than 1 micron to more than 1 millimeter in width or diameter.

12. The deformable optical system of claim 1, wherein a number of the extensions is at least up to 1 million per square millimeter.

13. The deformable optical system of claim 1, further comprising:
a measuring device configured to determine a wavefront error.

14. The deformable optical system of claim 13, wherein a number of the extensions used corrects at least one of Zernike polynomial terms and other representations of the wavefront error.

15. A deformable optical device, comprising:
a reflection device having a first reflecting surface and a second surface;
a piezoelectric device having a piezoelectric chuck and moveable extensions including piezoelectric pins, strips, or concentric rings, each of the extensions being coupled at a first end to a surface of the piezoelectric chuck and at a second end to the second surface of the reflection device; and
electrodes coupled to corresponding ones of the extensions,
wherein a controller is used to measure a change in capacitance of the extensions to determine characteristics of movement of the extensions.

16. The deformable optical device of claim 15, wherein the reflection device is a mirror.

17. The deformable optical device of claim 15, further comprising:
a conductive coating on the surface of the piezoelectric chuck; and
a conductive coating on the electrodes.

18. The deformable optical device of claim 15, wherein the reflection device is substantially planar.

19. The deformable optical device of claim 15, wherein the reflection device is curved.

20. The deformable optical device of claim 15, wherein the extensions are from less than 1 micron to more than 1 millimeter in diameter or width.

21. The deformable optical device of claim 15, wherein the electrodes are coupled, via the controller, to a measuring system that is configured to generate a voltage value corresponding to a measured wavefront aberration, the voltage value being used by the electrodes, via the controller, to control movement of the extensions.

* * * * *